W. C. EVANS.
LOCOMOTIVE.
APPLICATION FILED OCT. 2, 1914.
1,136,947.
Patented Apr. 27, 1915.
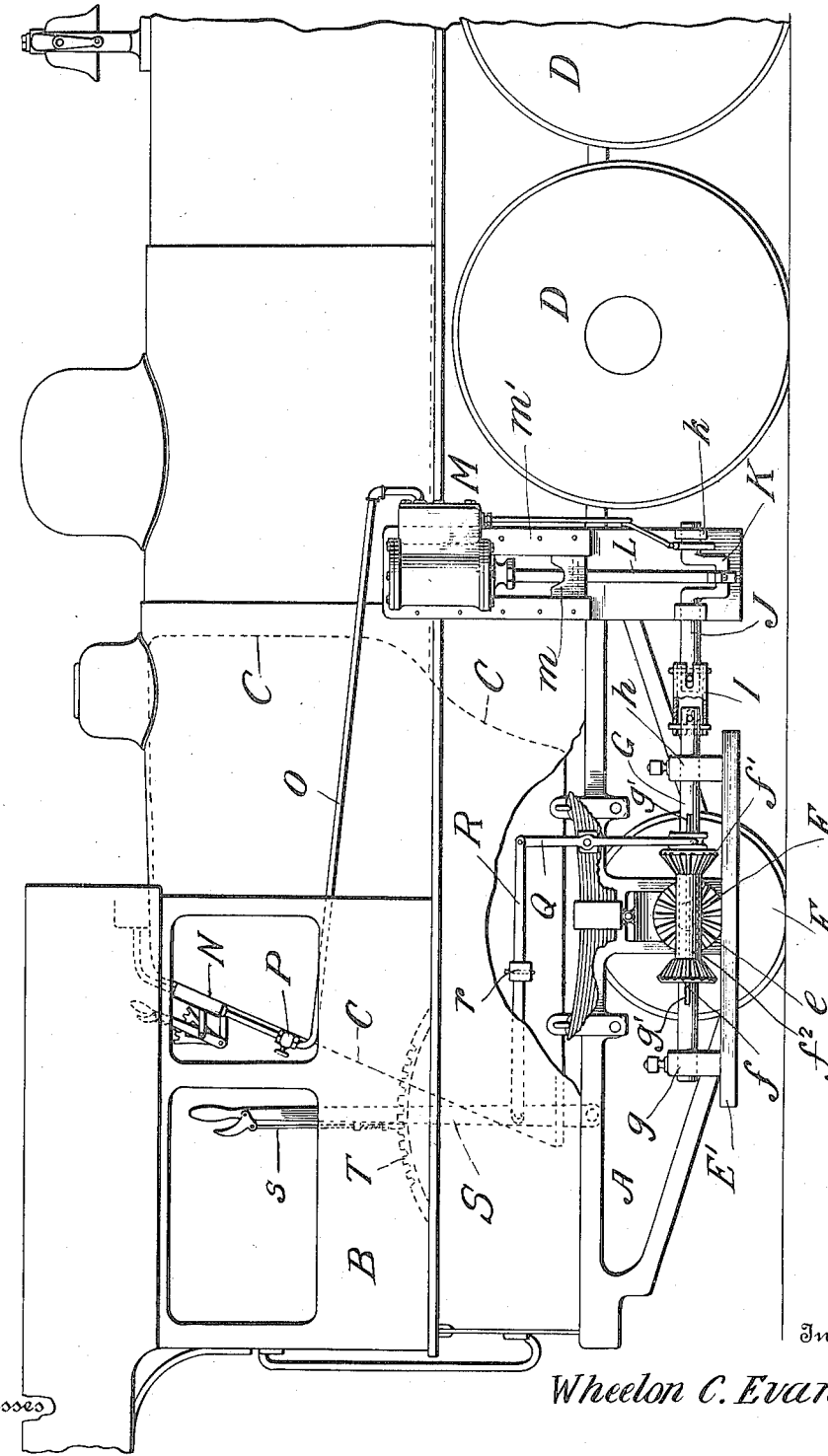
Witnesses
M. E. Burrell
O. F. Early
Inventor
Wheelon C. Evans
By his Attorneys
Baldwin Wight

UNITED STATES PATENT OFFICE.

WHEELON C. EVANS, OF MOUNT HERMAN, LOUISIANA.

LOCOMOTIVE.

1,136,947.      Specification of Letters Patent.      Patented Apr. 27, 1915.

Application filed October 2, 1914. Serial No. 864,600.

*To all whom it may concern:*

Be it known that I, WHEELON C. EVANS, a citizen of the United States, residing at Mount Herman, in the parish of Washington and State of Louisiana, have invented certain new and useful Improvements in Locomotives, of which the following is a specification.

This invention relates to locomotives of the class in which the boiler is supported on the main frame of the locomotive, to which the driving wheels also are connected and which is provided with a trailer comprising a trailer frame and trailer wheels constituting a truck so mounted as to enable the trailer wheels to move cross-wise or laterally relatively to the locomotive enabling the latter, which may be of great length, to readily take curves without undue strains on the engine frame.

The object of my invention is to provide locomotives of this class with an auxiliary engine for directly driving the trailer wheels when starting, when the load is excessive, or when ascending steep grades, and which is so constructed and connected with the trailer that it may at will be thrown into or out of gear with the trailer wheels or may be made to drive them either forward or backward while at the same time allowing them to have the necessary lateral or transverse movement when taking a curve.

By thus directly driving the trailer wheels, which are arranged directly under the fire box, great tractional effect may be obtained, enabling the locomotive to start with great power and to thus avoid the necessity of long running starts before ascending grades and to also add sufficient power to the main engine to enable the locomotive to ascend with ease grades of abrupt inclination.

In carrying out my invention, I mount the auxiliary engine on the locomotive engine boiler near the front end of the fire box and I join said auxiliary engine with the trailer axle by a flexible connection, allowing the trailer to move laterally or transversely relatively to the main frame of the locomotive. The gearing is such that the auxiliary engine may be thrown into or out of connection with the trailer axle or may be moved to drive it in either direction.

For the purpose of shifting the gearing, I provide a lever pivotally connected with some part of the trailer frame and connected with the gearing, and to this lever is jointed a connecting rod having a flexible portion enabling it to bend sidewise to accommodate the movement of the trailer wheels relatively to the locomotive body. This rod is connected with an operating lever, the handle of which is within easy reach of the engineer, and by means of which lever the engineer can control the gear connections between the trailer axle and the auxiliary engine, which latter takes steam from the locomotive boiler through the same throttle valve that controls the admission of steam to the main engine cylinders, but the pipe leading from the throttle valve to the auxiliary engine is equipped with a valve by means of which the supply of steam to the auxiliary engine may be controlled so that when the locomotive is running on a level the auxiliary engine may be cut out and the locomotive run at high speed, but when additional power is required the auxiliary engine may be readily put into service.

The accompanying drawing is a side elevation of so much of a locomotive, embodying my invention, as is necessary to illustrate my improvements.

The main engine frame A may be of usual or any suitable construction. The cab is indicated at B, and the fire box at C. D indicates the main driving wheels applied to the main frame of the locomotive in front of the fire box and thus providing a relatively short wheel base as usual.

The engines for actuating the main driving wheels are not illustrated as they form no part of this invention.

The trailer wheels E, axle $e$ and trailer frame E′ may be of usual construction, providing the usual lateral or transverse movement of the trailer wheels relatively to the locomotive. The axle $e$ is provided with a beveled gear F, adapted to mesh with beveled gears $f$, $f'$ on a sleeve $f^2$ mounted on a horizontally arranged shaft G, mounted in bearings $g$, $h$ on the trailer frame. The sleeve $f^2$ is adapted to slide endwise to a limited extent on the shaft G but is made to revolve therewith by means of a feather $g'$ on the shaft which engages a groove in the sleeve. The shaft G is connected by means of a flexible joint I with another horizontally arranged shaft J attached to a crank K to which the piston rod L of the auxiliary engine M is connected. The shaft J and crank K are mounted in suitable bearings $k$ on the frame of the auxiliary engine, which latter is secured to the boiler preferably in advance of, or close to, the front end of the fire box. The auxiliary engine may be of any suitable construction, its cross-head m working in guides m' in the usual way.

The joint I is made flexible in any suitable way to allow the shaft J to maintain its position without strain while allowing the shaft G to bend and thus follow the movements of the trailer axle.

The auxiliary engine M takes steam from the boiler through the throttle valve N, which also controls the steam supply to the main cylinders. The pipe O, leading from the throttle valve to the auxiliary engine is equipped with a valve P by means of which the supply of steam through it is regulated.

In order to drive the trailer wheels in either direction by means of the gears f f' or to disconnect them from the trailer axle, I provide a vertically arranged lever Q pivoted to some part of the trailer frame and engaging the sleeve f². To the upper end of this lever is jointed a connecting rod R having a flexible joint r and pivotally connected with an upright operating lever S having a detent s engaging a segment T. By means of this lever the sleeve f² with its beveled gears may be shifted in such manner as to cause the trailer wheels to be driven forward or backward, or the shaft may be thrown out of gear with the trailer axle.

The details of construction shown may be varied, but the organization should be such as to throw the weight of the fire box on the trailer wheels; a flexible connection should be provided between the auxiliary engine and the trailer axle, and the operating lever should be within convenient reach of the engineer and so connected with the trailer wheel driving shaft that the trailer wheels may move laterally or transversely relatively to the locomotive without breaking the connection to the auxiliary engine or putting any of the parts under undue strain.

I claim as my invention:—

1. A locomotive, having the main driving wheels below the boiler forward of the fire box, a trailer under the fire box and sustaining the weight thereof, and the wheels and axle of which are mounted to shift laterally when taking a curve, an auxiliary engine attached to the boiler, gearing connecting said engine with the trailer axle, and a flexible joint in said connection.

2. A locomotive, having the main driving wheels under the boiler forward of the fire box; a trailer under the fire box and sustaining the weight thereof, and the wheels and axle of which are mounted to shift laterally when taking a curve, an auxiliary engine attached to the boiler near the front of the fire box, gearing connecting said auxiliary engine with the trailer axle, and a flexible joint in said connection.

3. A locomotive, having the main driving wheels beneath the boiler forward of the fire box, a trailer under the fire box and sustaining the weight thereof, and the wheels and axle of which are mounted to shift laterally when taking a curve, an auxiliary engine attached to the boiler, a shaft carrying gear wheels for driving the trailer axle, another shaft operatively connected with the auxiliary engine, and a flexible connection between said shafts.

4. A locomotive, having the main driving wheels beneath the boiler forward of the fire box, a trailer under the fire box and sustaining the weight thereof and the wheels and axle of which are mounted to shift laterally when taking a curve, an auxiliary engine attached to the boiler, gearing connecting said auxiliary engine with the trailer axle, a flexible joint in said connection, an operating lever, a vertically arranged lever for shifting the gears, a connecting rod between said vertically arranged lever and said operating lever, and a flexible joint in said connecting rod.

In testimony whereof, I have hereunto subscribed my name.

WHEELON C. EVANS.

Witnesses:
E. W. OTT,
J. B. COLLEY.